(12) United States Patent
Iida

(10) Patent No.: US 6,399,688 B1
(45) Date of Patent: Jun. 4, 2002

(54) COATING COMPOSITION AND COATING METHOD

(76) Inventor: Shigeki Iida, 1-1-6-403, Yanagibashi, Taito-ku, Tokyo 111-0052 (JP)

( * ) Notice: Subject to any disclaimer, the term of this patent is extended or adjusted under 35 U.S.C. 154(b) by 0 days.

(21) Appl. No.: 09/426,338

(22) Filed: Oct. 25, 1999

(30) Foreign Application Priority Data

Oct. 4, 1999 (JP) .......................................... 11-283394

(51) Int. Cl.[7] ................................................ C08K 3/22
(52) U.S. Cl. ........................ 524/430; 428/429; 428/447; 524/399; 524/434
(58) Field of Search ................................ 524/430, 434, 524/399, 410; 428/429, 327, 447

(56) References Cited

U.S. PATENT DOCUMENTS

| | | | | |
|---|---|---|---|---|
| 4,599,394 A | * | 7/1986 | Lucas ........................... | 528/15 |
| 4,758,547 A | * | 7/1988 | Itabashi et al. ............. | 503/207 |
| 4,759,611 A | * | 7/1988 | Downey, Jr. ................. | 350/337 |
| 5,314,731 A | * | 5/1994 | Yoneda et al. .............. | 428/429 |
| 5,464,704 A | * | 11/1995 | Yoneda et al. .............. | 428/429 |
| 5,482,768 A | * | 1/1996 | Kawasato et al. .......... | 428/327 |
| 5,576,109 A | * | 11/1996 | Yoneda et al. .............. | 428/447 |
| 5,605,958 A | * | 2/1997 | Yoneda et al. .............. | 524/755 |
| 5,645,939 A | * | 7/1997 | Yoneda et al. .............. | 428/429 |

* cited by examiner

*Primary Examiner*—Edward J. Cain
*Assistant Examiner*—Katarzyna W. Lee
(74) *Attorney, Agent, or Firm*—Knobbe, Martens, Olson and Bear, LLP.

(57) ABSTRACT

A coating composition able to improve the cleanability and durability with respect to the surface of a substrate formed with an organic paint coating or the surface of a metal, plastic, glass, or other general substrate, containing superfine particles of tin oxide, indium oxide, or another metal oxide with an average size in the range of 5 to 15 nm, transparent with respect to visible light, and having conductivity, a binder containing a polyvinyl alcohol silylated by an isocyanate silane, colloidal silica, and a solvent of for example water, a glycol ether-based hydrophilic solvent, an alcohol-based hydrophilic solvent, or a mixture thereof, the coating composition being coated on an organic paint coating or other paint coating formed on a substrate or directly on the substrate for use as a protective coating.

17 Claims, 2 Drawing Sheets

COATING COMPOSITION AND COATING METHOD

BACKGROUND OF THE INVENTION

1. Field of the Invention

The present invention relates to a coating composition, more particularly to a coating composition used for the exterior of passenger cars, trains, and other vehicle bodies or for the exteriors of general houses, office buildings, and other buildings, able to resist deposition of dirt, and superior in cleanability by rinsing off the dirt.

2. Description of the Related Art

Broad use is being made of organic polymer paints for the exteriors of passenger cars, trains, and other vehicle bodies and exteriors of general houses, office buildings, and other buildings for the purpose of improving the beauty of the exteriors and protecting the substrate from rust and other corrosion.

Below, coatings formed by organic polymer paints will be referred to as "organic polymer paint coatings" or simply "organic paint coatings".

Vehicle bodies or buildings formed with the above organic paint coatings on their surface are exposed to the outside air, so dirt floating in the air ends up depositing on the organic paint coatings due to the attraction of static electricity or rainwater as medium. That is, the surface of the vehicle body or building becomes dirty and the external appearance is ruined.

Further, the dirt ends up becoming fixed to the organic paint coating over time and becomes hard to clean off by just rain or rinsing.

Looking at the cleanability of dirt deposited on organic paint coatings, due to the theory of interfacial energy of a plurality of substances in relative contact, it is known that the smaller the water contact angle on the surface of the organic painting coating becomes, that is, the higher the hydrophilicity of the surface of the organic painting coating becomes, the better the cleanability by rinsing off the dirt becomes.

FIG. 1 is a view of the results of the bonding energy of the carbon on the surfaces of substrates having various water contact angles in the air (A) and in the water (W) found experimentally.

Here, the carbon is a substance typifying the dirt. The smaller the bonding energy of the carbon becomes, the easier the dirt is to remove.

In the figure, in water (W), the smaller the water contact angle on the surface of the substrate becomes, that is, the higher the hydrophilicity of the surface of the substrate becomes, the smaller the bonding energy of the carbon becomes and the better the cleanability by rinsing becomes.

Since the water contact angle on the surface of a general organic paint coating used for an automobile or building is a large value of 75° to 105°, the results show that dirt easily deposits on the surface.

As a method for applying a hydrophilic coating material reducing the water contact angle on the surface of a substrate, such as the surface of an organic paint coating, the method of coating an aqueous solution of a polyvinyl alcohol or another hydrophilic organic polymer and the method of coating a dispersion comprised of titanium oxide particles having a photocatalysis function dispersed in a solvent have been developed.

Summarizing the problems to be solved by the invention, the method of coating an aqueous solution of an aqueous organic polymer can improve the cleanability of dirt by rinsing by reducing the water contact angle on the surface of the substrate, but suffers from the problem of durability since the coating dissolves and is washed away due to rain or rinsing.

The method of coating a solution of titanium oxide particles having a photocatalysis function can reduce the water contact angle by breaking down the water by photocatalysis and generating active oxygen and can improve the cleanability, but there is the problem that the paint coating of the substrate is also broken down and deteriorated.

Further, there is the method of adhering a film processed in advance to have a hydrophilic surface on to the surface of the substrate through a adhesive.

This film, however, has to be adhered matching the shape of the substrate. When the substrate is complicated in shape, its adhesion becomes extremely difficult.

The surface being the problem in cleanability is not limited to the above organic paint coating. A similar situation occurs in surfaces of plastic, glass, and other general substrates.

SUMMARY OF THE INVENTION

An object of the present invention is to provide a coating composition able to improve the cleanability and durability with respect to the surface of a substrate formed with an organic paint coating or the surface of a metal, plastic, glass, or other general substrate, and another object of the present invention is to provide a coating method using the coating composition.

To achieve the above object, the coating composition of the present invention comprises superfine particles of a metal oxide transparent with respect to visible light and having conductivity and a binder containing a polyvinyl alcohol silylated by an isocyanate silane.

In the coating composition of the present invention, the isocyanate silane is a compound of:

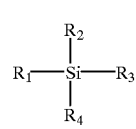

(a)

(wherein, $R_1$, $R_2$, $R_3$, and $R_4$ are each a hydrogen, alkyl group, alkoxy group, or other monovalent substituent group, at least one substituent group among $R_1$, $R_2$, $R_3$, and $R_4$ including an isocyanate group (—N═C═O)) and can introduce a silyl group (—$SiR_1R_2R_3$ (where $R_1$, $R_2$, and $R_3$ are each a hydrogen, alkyl group, alkoxy group, or other monovalent substituent group) into a polyvinyl alcohol ((—$CH_2$—CHOH—)$_n$).

The binder including the above silylated polyvinyl alcohol can provide a surface with a high hydrophilicity, that is, a surface with a small water contact angle, for example, can make the water contact angle about 9 degrees.

Further, the binder containing the polyvinyl alcohol silylated by an isocyanate silane is designed to be resistant to dissolution in water or the rain by the introduction of the silyl group. Due to this, it is possible to improve the durability of the coating layer formed by coating the coating composition of the present invention.

Further, the coating composition of the present invention contains superfine particles of a metal oxide transparent to visible light and having conductivity.

The smaller the conductivity of the surface becomes, that is, the larger the electrical resistance of the surface becomes, the larger the amount of deposition of dirt due to the static electricity of the surface of the substance becomes. The larger the electrical resistance becomes, the longer the charge half life becomes and the easier the deposition of dirt becomes due to static electricity. For example, the charge half life of the surface of a general organic paint coating used in an automobile or building is a long value of 40 to 60 minutes.

To deal with this problem, it is possible to provide a coating layer formed by coating the coating composition of the present invention where the superfine particles of the metal oxide having conductivity enable the electrical resistance to be made smaller and the static electricity to be quickly removed and enable the charge half life of the surface of the coating layer formed by coating the coating composition of the present invention to be greatly shortened.

Therefore, it is possible to reduce the deposition of dirt due to the static electricity of the surface of the substance.

Further, the superfine particles of the metal oxide are transparent to visible light and will not detract from the external appearance of the surface formed with the coating layer.

As explained above, the coating composition of the present invention can be coated on an organic paint coating, metal, plastic, glass, or other substrate to reduce the water contact angle on the surface of the coating layer and simultaneously reduce the electrical resistance of the surface to improve the cleanability, durability, etc.

The coating composition of the present invention preferably contains a metal oxide comprised of at least one of tin oxide and indium oxide.

Further, preferably, the average size of the superfine particles of the metal oxide is in the range of 5 to 15 nm.

Superfine particles or tin oxide, indium oxide, or other metal oxides with an average size in the range of 5 to 15 nm can be made transparent to visible light.

The coating composition of the present invention preferably further contains colloidal silica.

By including colloidal silica, it is possible to improve the hydrophilicity of the surface of the coating layer.

The coating composition of the present invention preferably contains as a solvent water, a glycol ether-based hydrophilic solvent, an alcohol-based hydrophilic solvent, or a mixture thereof.

By diluting the composition by the above solvent, it is possible to obtain a coating composition adjusted in viscosity etc. and made superior in coatability.

To achieve the above object, the coating method of the present invention comprises a step of coating above coating composition on a substrate.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Figure 1:
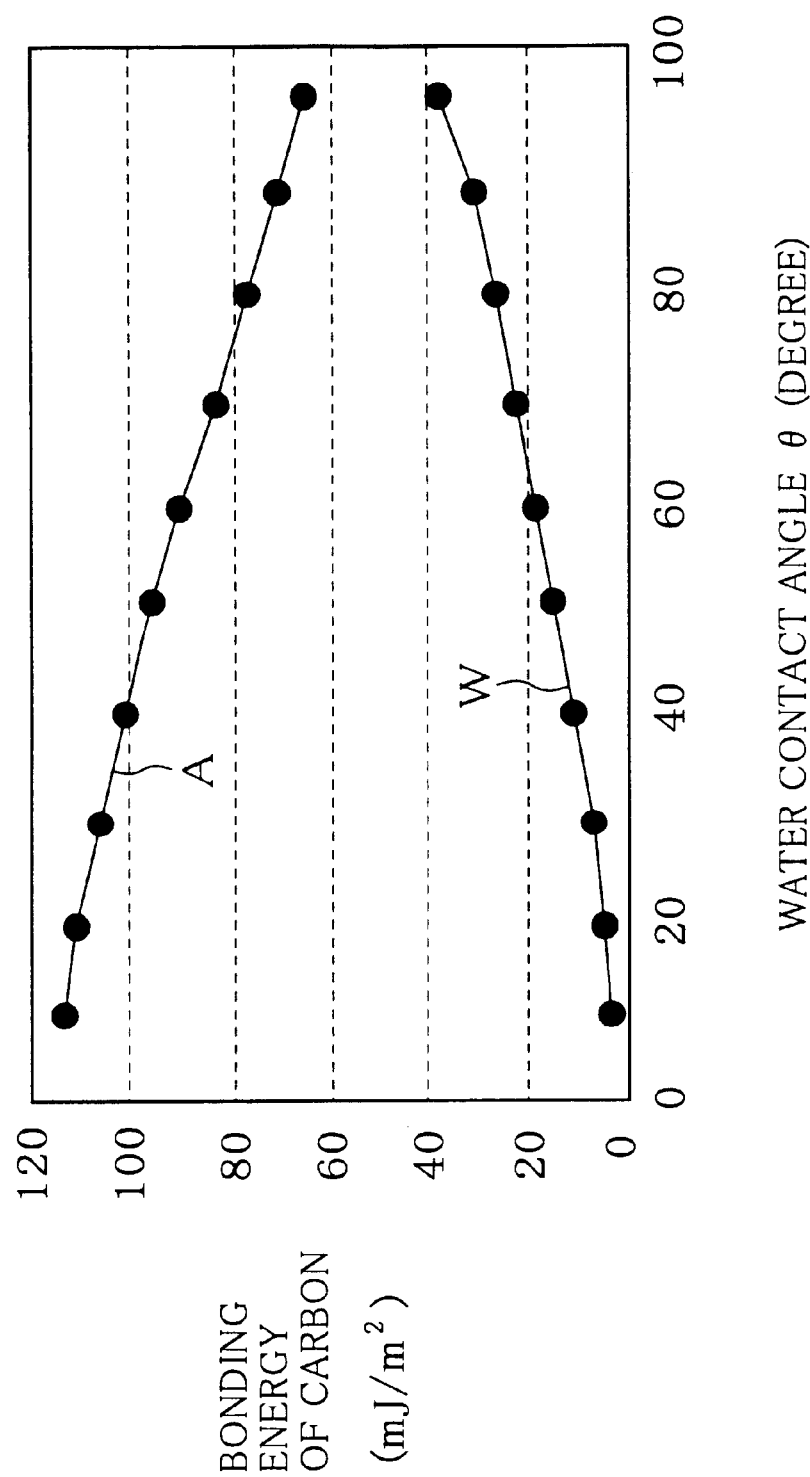
FIG. 1 is a view of the results of the bonding energy of carbon on the surfaces of substrates having various water contact angles in the air (A) and in the water (W) found experimentally.

Embodiments of the coating composition of the present invention will be explained in detail below.

The coating composition of the present invention contains superfine particles of a metal oxide transparent to visible light and having conductivity and a binder containing a polyvinyl alcohol silylated by an isocyanate silane.

In the coating composition of the above embodiment, the isocyanate silane is a compound of the following formula:

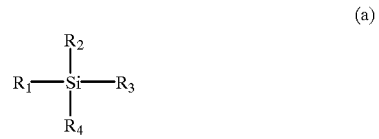

(a)

where, $R_1$, $R_2$, $R_3$, and $R_4$ are each a hydrogen, alkyl group, alkoxy group, or a monovalent substituent group, at least one substituent of $R_1$, R2, R3, and $R_4$ including an isocyanate group ($-N=C=O$).

The above isocyanate silane can introduce a silyl group into the polyvinyl alcohol.

The above silyl group is not limited to a ($-SiH_3$) group and is a substituent group represented by ($-SiR_1R_2R_3$ ($R_1$, $R_2$, and $R_3$ each being a hydrogen, alkyl group, alkoxy group, or other monovalent substituent group)).

As examples of the above isocyanate silane, for example, preferable use may be made of the following compounds:

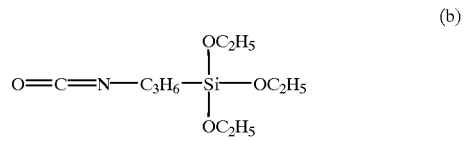

(b)

The reaction formula will be shown below wherein the polyvinyl alcohol is silylated by isocyanate silane compound b shown above.

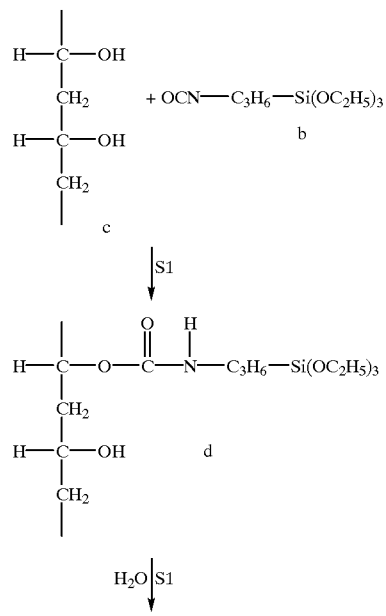

-continued

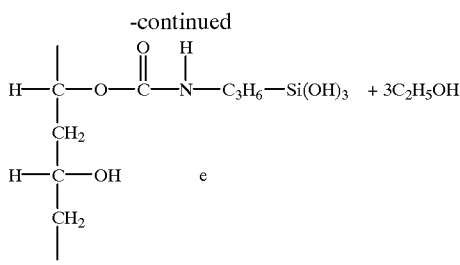

As explained above, the addition reaction (S1) accompanying transfer of hydrogen between the isocyanate group of the isocyanate silane compound b and the hydroxy group of the polyvinyl alcohol c results in a polyvinyl alcohol d in which a (—Si(OC$_2$H$_5$)$_3$) group is introduced.

Next, the above (—Si(OC$_2$H$_5$)$_3$) group is converted to a (—Si(OH)$_3$) group by a hydrolysis reaction (S2) to obtain the compound e.

In the above compound e, as the polymerization molar ratio, for example one of a polyvinyl alcohol: (—Si(OC$_2$H$_5$)$_3$) group=10:1 or so, that is, 10% or so of the total hydroxy groups in the polyvinyl alcohol may be made the extent substituted by silyl groups.

The binder containing the above silylated polyvinyl alcohol can provide a coating layer which has a highly hydrophilic surface, that is, a surface with a small water contact angle and further can improve the durability.

The above water contact angle may for example be made about 9 degrees.

Further, the coating composition of the present embodiment contains superfine particles of a metal oxide transparent to visible light and having conductivity.

The superfine particles of the metal oxide having conductivity enable the electrical resistance to be made smaller and the static electricity to be quickly removed and enable the amount of deposition of the dirt due to the static electricity of the surface of the substance to be reduced.

In the coating composition of the above embodiment, as the metal oxide having conductivity, use may be made of a metal oxide containing at least one of for example tin oxide and indium oxide.

Further, the average size of the superfine particles of the metal oxide is preferably in the range of 5 to 15 nm. If larger than this range, the transparency with respect to visible light falls, while if smaller than this range, the effect of reduction of the electrical resistance ends up falling.

As explained above, superfine particles of a metal oxide of tin oxide or indium oxide etc. having an average size in the range of 5 to 15 nm enables the electrical resistance of the coating layer to be controlled to be small and transparency to be given to visible light.

The coating composition of the above embodiment more preferably further contains colloidal silica.

By including colloidal silica, it is possible to further improve the hydrophilicity of the surface of the coating layer.

The coating composition of the above embodiment preferably contains as a solvent water, a glycol ether-based hydrophilic solvent, an alcohol-based hydrophilic solvent, or mixtures of the same.

By diluting the above solvent, it is possible to obtain a coating composition adjusted in viscosity etc. and superior in coatability.

Figure 2:
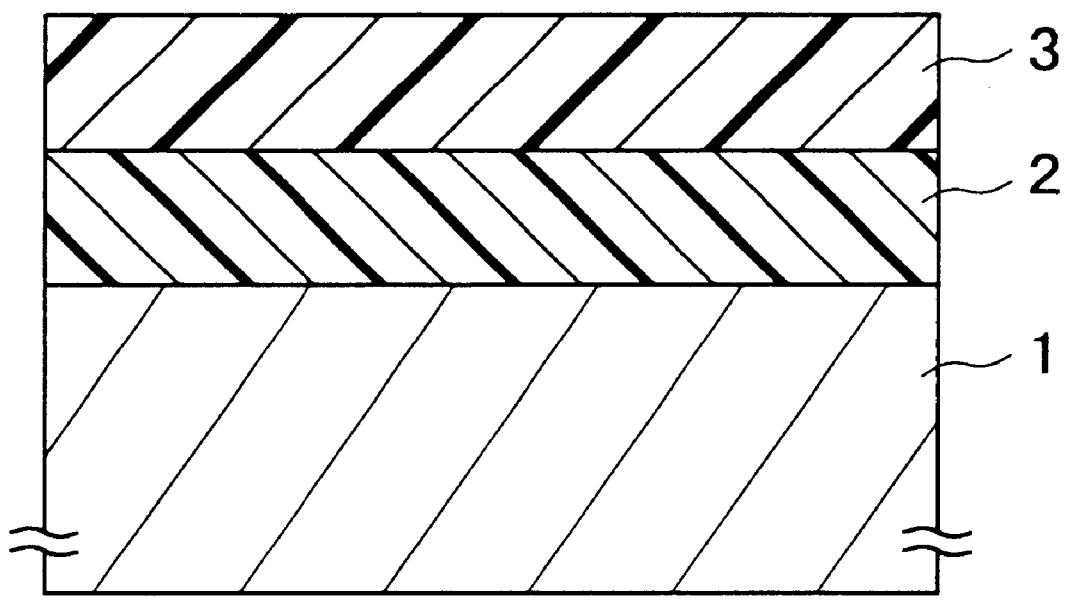
FIG. 2 is a sectional view of a coated object formed by coating the coating composition of the present invention on a substrate.

FIG. 2 is a sectional view of a coated object obtained by coating a coating composition of the above embodiment on a substrate.

An organic polymer paint coating or other paint coating 2 is formed for the purpose of prevention of corrosion or decoration etc. of a substrate 1. A coating composition of this embodiment is coated on the top layer to form a protective coating 3.

The above substrate is not particularly limited. For example, iron, aluminum, stainless steel, copper, or another metal substrate, polyethylene or another polyolefin resin, polyvinyl chloride, ethylene-vinyl acetate copolymer, or another vinyl-based resin, polyethylene terephthalate or another polyester resin, methyl polymethacrylate or another acryl resin, polystyrene, acrylonitrile-butadiene-styrene copolymer (ABS resin), polycarbonate, or another plastic-based substrate, reinforced glass, nonalkali glass, quartz glass, or another glass-based substrate, or other various substrates may be used.

Further, an organic polymer paint coating or other paint coating 2 is formed in FIG. 2, but the paint coating 2 does not necessarily have to be formed and can be formed in accordance with the application.

As the method of coating a coating composition of the present embodiment on the above substrate, for example, it is possible to use various methods such as the ordinary gravure coating, roll coating, bar coating, or screen printing or combinations of the same.

According to the coating composition of the above embodiment, it is possible to provide a coating composition which can be coated on a substrate of an exterior of a passenger car, train, or other vehicle body or exterior of a general house including window glass or an office building or other building so as to reduce the water contact angle of the surface of the paint coating and simultaneously reduce the electrical resistance of the surface so as to improve the cleanability, durability, etc.

The present invention will be explained in detail below with reference to examples.

In the following examples, the compound e explained above was used as the polyvinyl alcohol silylated by an isocyanate silane.

EXAMPLE 1

A white acryl urethane paint for evaluation was coated on a substrate comprised of an iron sheet of 0.5 thickness, then the coating agent A of the following composition was coated on the top surface to an amount of 20 g/m$^2$ and dried to prepare Example 1.

Coating Agent A:

| | |
|---|---|
| Superfine particles of tin oxide of average size of 5 nm (particle size dispersion 10%) (15% dispersion in water) | 3 parts by weight |
| Polyvinyl alcohol silylated by isocyanate silane (5% aqueous solution) | 10 parts by weight |
| Colloidal silica of average particle size of 15 nm (particle size dispersion 5%)) (dispersion in water) | 9 parts by weight |
| Deionized water (solvent) | 78 parts by weight |

EXAMPLE 2

A white acryl urethane paint for evaluation was coated on a substrate comprised of an iron sheet of 0.5 thickness, then the coating agent B of the following composition was coated on the top surface to an amount of 20 g/m$^2$ and dried to prepare Example 2.

Coating Agent B:

| | |
|---|---|
| Superfine particles of tin oxide of average size of 5 nm (particle size. dispersion 10%) (15% dispersion in water) | 3 parts by weight |
| Polyvinyl alcohol silylated by isocyanate silane (5% aqueous solution) | 10 parts by weight |
| Colloidal silica of average particle size of 15 nm (particle size dispersion 5%) (dispersion in water) | 9 parts by weight |
| Deionized water (solvent) | 20 parts by weight |
| Glycol ether-based solvent | 58 parts by weight |

EXAMPLE 3

A white acryl urethane paint for evaluation was coated on a substrate comprised of an iron sheet of 0.5 thickness, then the coating agent C of the following composition was coated on the top surface to an amount of 20 g/m² and dried to prepare Example 3.

Coating Agent C:

| | |
|---|---|
| Superfine particles of tin oxide of average size of 5 nm (particle size dispersion 10%) (15% dispersion in water) | 5 parts by weight |
| Polyvinyl alcohol silylated by isocyanate silane (5% aqueous solution) | 10 parts by weight |
| Colloidal silica of average particle size of 15 nm (particle size dispersion 5%) (dispersion in water) | 7 parts by weight |
| Deionized water (solvent) | 78 parts by weight |

EXAMPLE 4

A white acryl urethane paint for evaluation was coated on a substrate comprised of an iron sheet of 0.5 thickness, then the coating agent D of the following composition was coated on the top surface to an amount of 20 g/m² and dried to prepare Example 4.

Coating Agent D:

| | |
|---|---|
| Superfine particles of tin oxide of average size of 5 nm (particle size dispersion 10%) (15% dispersion in water) | 5 parts by weight |
| Polyvinyl alcohol silylated by isocyanate silane (5% aqueous solution) | 10 parts by weight |
| Colloidal silica of average particle size of 15 nm (particle size dispersion 5 %) (dispersion in water) | 7 parts by weight |
| Deionized water (solvent) | 20 parts by weight |
| Glycol ether-based solvent | 58 parts by weight |

EXAMPLE 5

A white acryl urethane paint for evaluation was coated on a substrate comprised of an iron sheet of 0.5 thickness, then the coating agent E of the following composition was coated on the top surface to an amount of 20 g/m² and dried to prepare Example 5.

Coating Agent E:

| | |
|---|---|
| Superfine particles of tin oxide of average size of 5 nm (particle size dispersion 10%) (15% dispersion in water) | 7 parts by weight |
| Polyvinyl alcohol silylated by isocyanate silane (5% aqueous solution) | 10 parts by weight |
| Colloidal silica of average particle size of 15 nm (particle size dispersion 5%) (dispersion in water) | 5 parts by weight |
| Deionized water (solvent) | 78 parts by weight |

EXAMPLE 6

A white acryl urethane paint for evaluation was coated on a substrate comprised of an iron sheet of 0.5 thickness, then the coating agent F of the following composition was coated on the top surface to an amount of 20 g/m² and dried to prepare Example 6.

Coating Agent F:

| | |
|---|---|
| Superfine particles of tin oxide of average size of 5 nm (particle size dispersion 10%) (15% dispersion in water) | 7 parts by weight |
| Polyvinyl alcohol silylated by isocyanate silane (5% aqueous solution) | 10 parts by weight |
| Colloidal silica of average particle size of 15 nm (particle size dispersion 5%) (dispersion in water) | 5 parts by weight |
| Deionized water (solvent) | 20 parts by weight |
| Glycol ether-based solvent | 58 parts by weight |

EXAMPLE 7

A white acryl urethane paint for evaluation was coated on a substrate comprised of an iron sheet of 0.5 thickness, then the coating agent G of the following composition was coated on the top surface to an amount of 20 g/m² and dried to prepare Example 7.

Coating Agent G:

| | |
|---|---|
| Superfine particles of indium oxide of average size of 5 nm (particle size dispersion 10%) (15% dispersion in water) | 3 parts by weight |
| Polyvinyl alcohol silylated by isocyanate silane (5% aqueous solution) | 10 parts by weight |
| Colloidal silica of average particle size of 15 nm (particle size dispersion 5%) (dispersion in water) | 9 parts by weight |
| Deionized water (solvent) | 78 parts by weight |

EXAMPLE 8

A white acryl urethane paint for evaluation was coated on a substrate comprised of an iron sheet of 0.5 thickness, then the coating agent H of the following composition was coated on the top surface to an amount of 20 g/m² and dried to prepare Example 8.

Coating Agent H:

| | |
|---|---|
| Superfine particles of indium oxide of average size of 5 nm (particle size dispersion 10%) (15% dispersion in water) | 3 parts by weight |
| Polyvinyl alcohol silylated by isocyanate silane (5% aqueous solution) | 10 parts by weight |
| Colloidal silica of average particle size of 15 nm (particle size dispersion 5%) (dispersion in water) | 9 parts by weight |
| Deionized water (solvent) | 20 parts by weight |
| Glycol ether-based solvent | 58 parts by weight |

Comparative Example 1

A white acryl urethane paint for evaluation was coated on a substrate comprised of an iron sheet of 0.5 thickness, then the coating agent I of the following composition was coated on the top surface to an amount of 20 g/m² and dried to prepare Comparative Example 1.

Coating Agent I:

| | |
|---|---|
| Colloidal silica of average particle size of 15 nm (particle size dispersion 5%) (dispersion in in water) | 12 parts by weight |
| Isotatic type polyvinyl alcohol (5% aqueous solution) | 10 parts by weight |
| Deionized water (solvent) | 78 parts by weight |

Comparative Example 2

A white acryl urethane paint for evaluation was coated on a substrate comprised of an iron sheet of 0.5 thickness, then a coating agent including a surfactant was coated on the top surface to prepare Comparative Example 2.

Comparative Example 3

A white acryl urethane paint for evaluation was coated on a substrate comprised of an iron sheet of 0.5 thickness, then the coating agent J of the following composition was coated on the top surface to an amount of 20 g/m² and dried to prepare Comparative Example 3.

Coating Agent J:

| | |
|---|---|
| Superfine particles of titanium oxide of average particle size of 15 nm (particle size dispersion 10%) (15% dispersion in water) | 9 parts by weight |
| Isotatic type polyvinyl alcohol (5% aqueous solution) | 7 parts by weight |
| Deionized water (solvent) | 84 parts by weight |

Artificial Dirt Deposition Test

The samples obtained in the above examples and comparative examples were covered with the artificial dirt of the following composition and allowed to stand at 80° C. for 24 hours, then the state of cleaning of the artificial dirt by rinsing was investigated. The results are shown in Table 1. In the table, "good" indicates that the artificial dirt was sufficiently cleaned off, "fair" indicates that some residue was observed, and "poor" indicates that the artificial dirt remained.

| Artificial Dirt Composition: | |
|---|---|
| Carbon black | 2.3 parts by weight |
| Test dust type 12 | 9.3 parts by weight |
| Yellow ochre | 62.8 parts by weight |
| Sintered Kanto loam | 20.9 parts by weight |
| Silica powder | 4.7 parts by weight |

Weatherability Test

The samples obtained in the above examples and comparative examples were left outside for 90 days and then the state of dirt investigated visually. The results are shown in Table 1. In the table, "good" indicates the dirt was of an inconspicuous extent, "fair" indicates that the coating ended up being dissolved away by rainwater, "fair-poor" indicates that the white acryl urethane paint for evaluation deteriorated (chalking phenomenon), and "poor" indicates that the dirt was remarkable.

Nitrogen Oxide Formation Test

The states of formation of nitrogen oxides on the surfaces of the samples obtained in the above examples and comparative examples were investigated. The results are shown in Table 1. In the table, "good" indicates no nitrogen oxides were formed, while "poor" indicates nitrogen oxides were formed.

TABLE 1

Results of Test of Dirt Resistance

| | Artificial dirt deposition test | Weatherability test | Nitrogen oxide formation test |
|---|---|---|---|
| Example 1 | Good | Good | Good |
| Example 2 | Good | Good | Good |
| Example 3 | Good | Good | Good |
| Example 4 | Good | Good | Good |
| Example 5 | Good | Good | Good |
| Example 6 | Good | Good | Good |
| Example 7 | Good | Good | Good |
| Example 8 | Good | Good | Good |
| Comp. Ex. 1 | Fair | Fair | Good |
| Comp. Ex. 2 | Poor | Poor | Good |
| Comp. Ex. 3 | Fair | Fair-poor | Poor |

As clear from Table 1, the samples of Examples 1 to 8 exhibit better results in the test on artificial dirt deposition and weatherability and the test on formation of nitrogen oxides compared with the samples of Comparative Examples 1 to 3. It was confirmed that resistance is given to deposition of dirt by the dirt preventing coating agent of the present invention.

While the invention has been described with reference to specific embodiment chosen for purpose of illustration, it should be apparent that numerous modifications could be made thereto by those skilled in the art without departing from the basic concept and scope of the invention.

For example, the colloidal silica is not necessarily required.

Further, it is also possible to use a solvent other than water, a glycol ether-based solvent, or an alcohol-based solvent.

In addition, it is possible to make various changes within the scope of the gist of the present invention.

Summarizing the effects of the invention, as explained above, according to the present invention, it is possible to provide a coating composition which can be coated on a substrate of an exterior of a passenger car, train, or other vehicle body or exterior of a general house including window glass or an office building or other building so as to reduce the water contact angle of the surface of the coating and simultaneously reduce the electrical resistance of the surface so as to improve the cleanability, durability, etc.

What is claimed is:

1. A coating layer formed on a substrate and having an outermost protective coating layer subjected to cleaning with water, said outermost protective coating layer comprising:

superfine particles of a metal oxide transparent with respect to visible light and having conductivity and a hydrophilic binder containing a polyvinyl alcohol silylated by a monoisocyanate silane, wherein hydroxyl groups of the polyvinyl alcohol are partially substituted by silyl groups derived from the isocyanate silane for improving cleanability by flowing water.

2. A coating layer as set forth in claim 1, wherein the metal oxide is selected from the group consisting of tin oxide and indium oxide.

3. A coating layer as set forth in claim 1, wherein an average diameter of the superfine particles of the metal oxide is in a range of 5 to 15 nm.

4. A coating layer as set forth in claim 2, wherein an average diameter of the superfine particles of the metal oxide is in a range of 5 to 15 nm.

5. A coating layer as set forth in claim 1, further comprising colloidal silica.

6. A coating layer as set forth in claim 2, further comprising colloidal silica.

7. A coating layer as set forth in claim 3, further comprising colloidal silica.

8. A coating layer as set forth in claim 4, further comprising colloidal silica.

9. A coating layer as set forth in claim 1, further comprising as a solvent water, a glycol ether-based hydrophilic solvent, an alcohol-based hydrophilic solvent, or a mixture thereof.

10. A coating layer as set forth in claim 2, further comprising as a solvent water, a glycol ether-based hydrophilic solvent, an alcohol-based hydrophilic solvent, or a mixture thereof.

11. A coating layer as set forth in claim 3, further comprising as a solvent water, a glycol ether-based hydrophilic solvent, an alcohol-based hydrophilic solvent, or a mixture thereof.

12. A coating layer as set forth in claim 4, further comprising as a solvent water, a glycol ether-based hydrophilic solvent, an alcohol-based hydrophilic solvent, or a mixture thereof.

13. A coating layer as set forth in claim 5, further comprising as a solvent water, a glycol ether-based hydrophilic solvent, an alcohol-based hydrophilic solvent, or a mixture thereof.

14. A coating layer as set forth in claim 6, further comprising as a solvent water, a glycol ether-based hydrophilic solvent, an alcohol-based hydrophilic solvent, or a mixture thereof.

15. A coating layer as set forth in claim 7, further comprising as a solvent water, a glycol ether-based hydrophilic solvent, an alcohol-based hydrophilic solvent, or a mixture thereof.

16. A coating layer as set forth in claim 8, further comprising as a solvent water, a glycol ether-based hydrophilic solvent, an alcohol-based hydrophilic solvent, or a mixture thereof.

17. A coating layer as set forth in claim 1, which has a contact angle of approximately 9°.

* * * * *